Nov. 24, 1931.                C. A. PETERS                  1,833,036
                         AGRICULTURAL IMPLEMENT
                    Filed May 22, 1929        4 Sheets-Sheet 1

Inventor:
C. A. Peters.
By Whiteley and Ruckman
Attorneys.

Nov. 24, 1931.  C. A. PETERS  1,833,036
AGRICULTURAL IMPLEMENT
Filed May 22, 1929  4 Sheets-Sheet 3

Inventor:
C. A. Peters.
By Whiteley and Ruckman
Attorneys

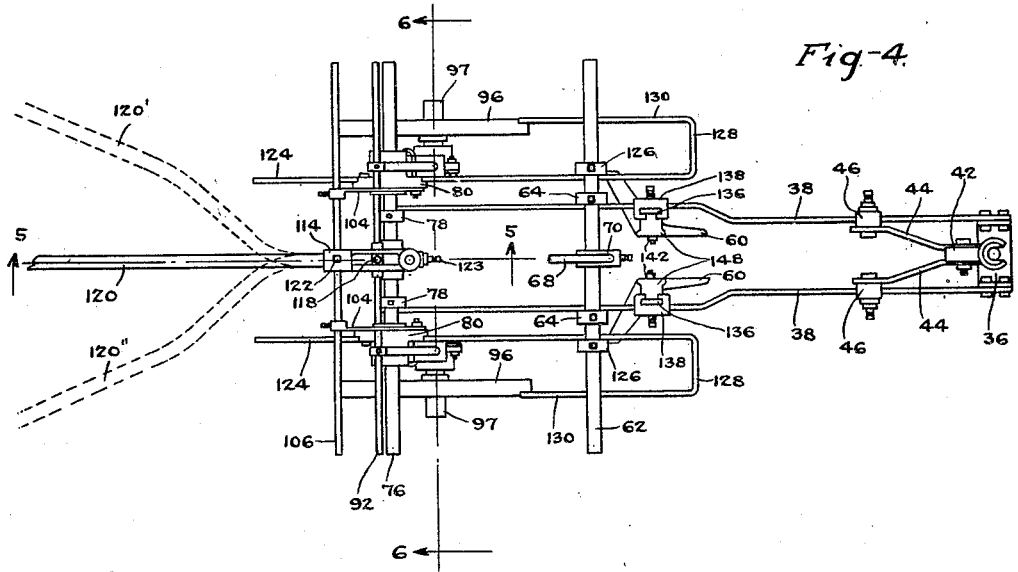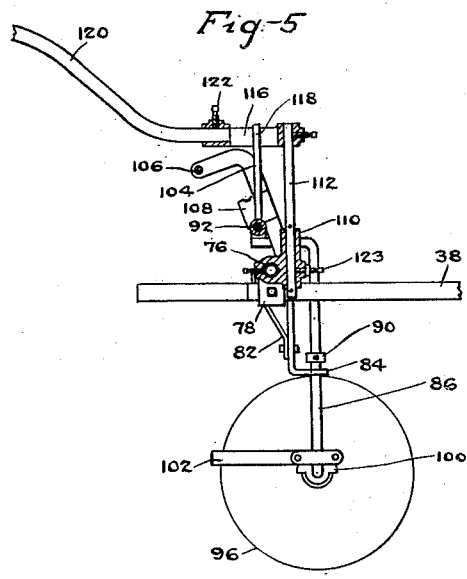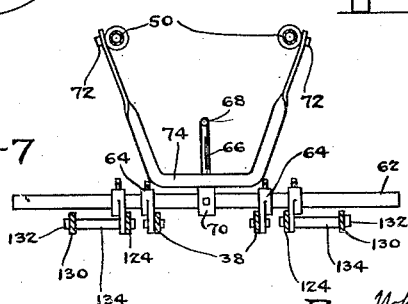

Patented Nov. 24, 1931

1,833,036

UNITED STATES PATENT OFFICE

CORNELIUS A. PETERS, OF MINNEAPOLIS, MINNESOTA, ASSIGNOR OF ONE-HALF TO C. J. DEPEW, OF MINNEAPOLIS, MINNESOTA

AGRICULTURAL IMPLEMENT

Application filed May 22, 1929. Serial No. 365,144.

My invention relates to agricultural implements, and it relates more particularly to garden cultivators, although it is to be understood that some of the features of the invention may be used with other implements such as plows. An object of the invention is to provide an implement of this character which is easy and economical to manufacture, efficient in operation, and of sufficiently light weight so that it may be readily steered and manipulated for use by small farmers and truck gardeners. Another object is to provide a construction by means of which the implement frame may be lifted in order to clear the cultivator teeth or other tools from weeds. Another object is to provide a construction whereby the implement frame may be held in raised condition so as to keep the cultivator teeth or other tools above the ground while the implement is being drawn by a tractor to the ground which is to be worked. Another object is to provide an implement which may be readily steered by the operator independently of the tractor which is used for pulling the implement. Another object is to provide a construction whereby the operator may steer the implement either while walking directly back of the middle thereof or while walking at either side of the middle. Another object is to provide means for locking the independent steering action of the implement so that if desired the steering may be done entirely through the tractor. Another object is to provide a construction by means of which either a single row of plants or a plurality of rows of plants may be cultivated.

The full objects and advantages of my invention will appear in connection with the detailed description thereof, and the novel features of my inventive idea will be particularly pointed out in the claims.

In the accompanying drawings which illustrate a practical embodiment of my invention,—

Figure 1:
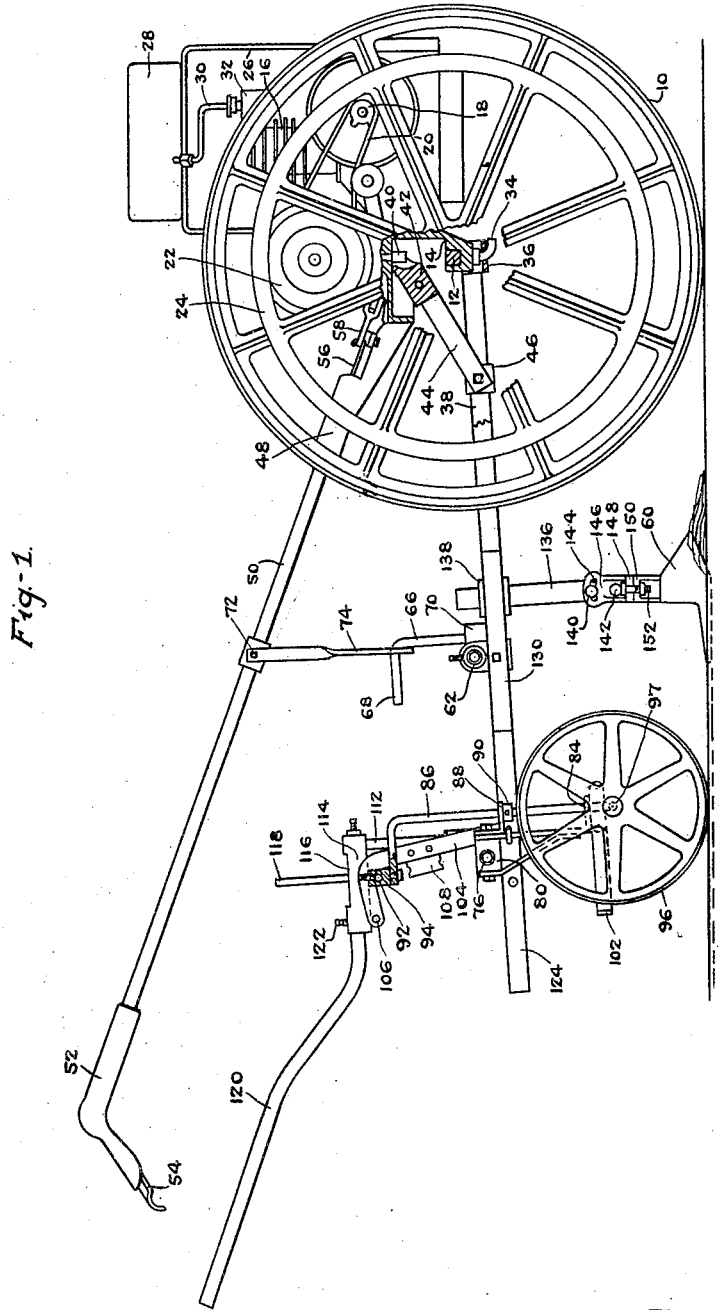
Figure 2:
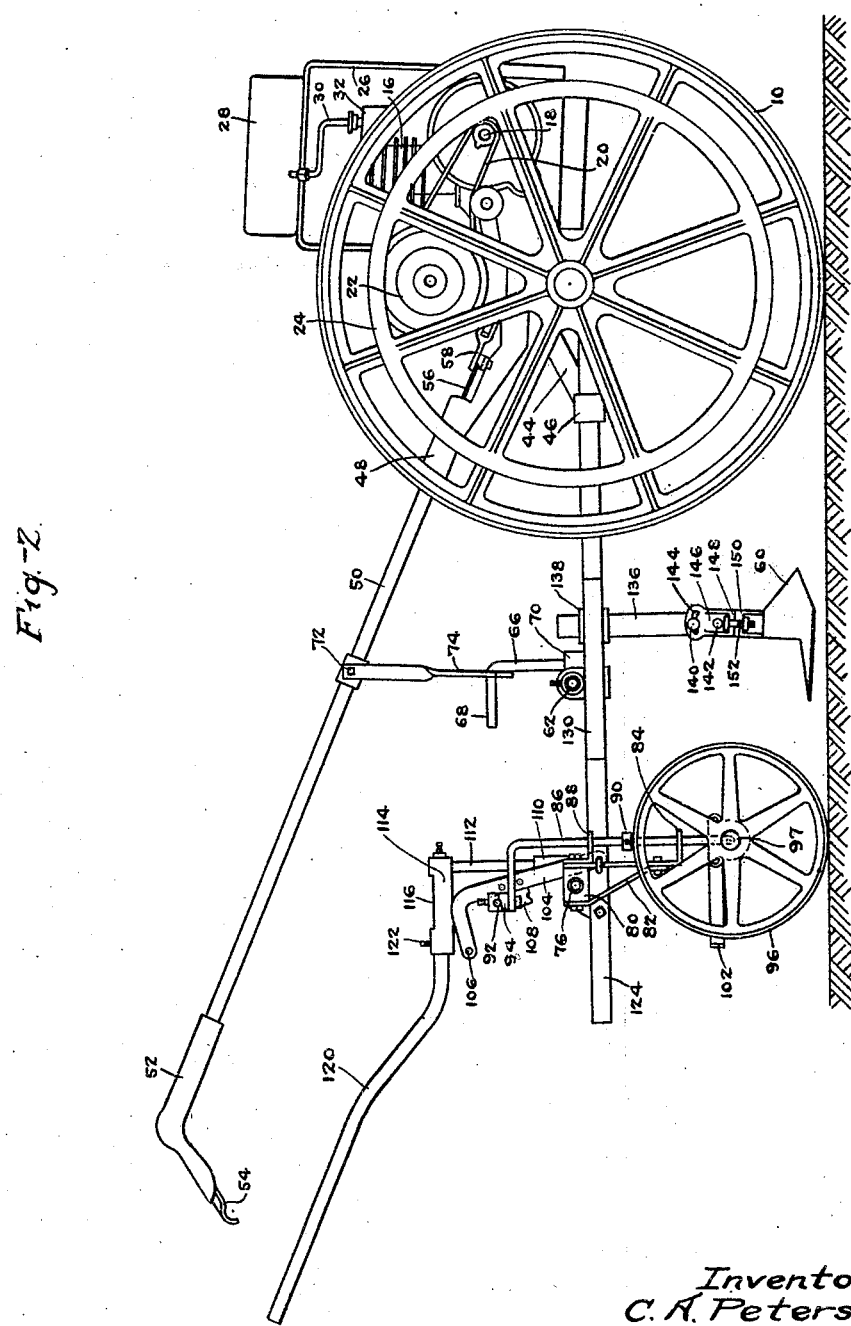
Figure 3:
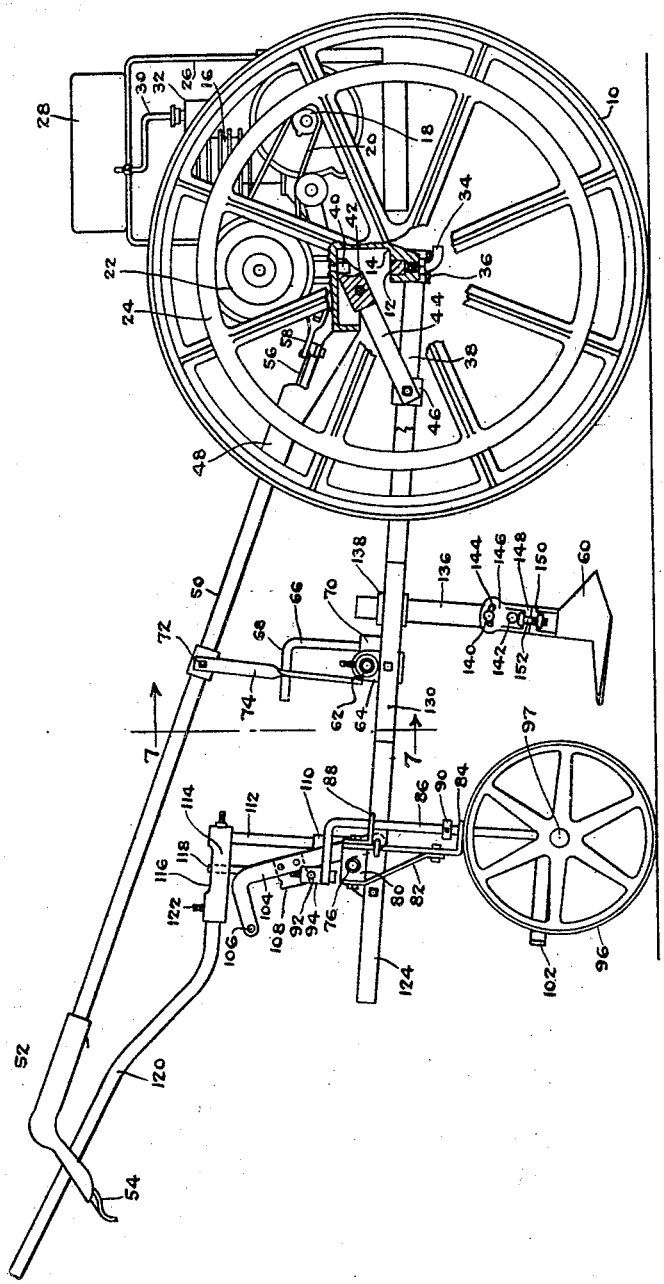

Fig. 1 is a side elevational view of the device in cultivating position, a small portion of the tractor being broken away for illustrative purposes. Fig. 2 is a side elevational view of the device showing the cultivator teeth lifted from the ground to free them from weeds. Fig. 3 is a side elevational view of the device showing the cultivator teeth held in raised position so that the device may be readily moved from place to place. Fig. 4 is a top plan view of the implement. Fig. 5 is a view in vertical section on the line 5—5 of Fig. 4. Fig. 6 is a view in vertical section on the line 6—6 of Fig. 4. Fig. 7 is a view in vertical section on the line 7—7 of Fig. 1.

Referring to the particular construction illustrated in the drawings in which a tractor is shown in order to illustrate the attachment of the implement thereto, tractor wheels 10 are rotatably mounted on a square stationary shaft 12 secured in a recess in an angular support 14 as shown in Figs. 1 and 3. The motor for the tractor consists of an internal combustion engine 16 the shaft of which drives a sprocket wheel 18 connected by a sprocket chain 20 to the shaft of frictional drive wheels 22 which engage driving flanges 24 carried by the spokes of the wheels 10. A sheet metal angular support 26 carried by the base of the engine has an upper horizontal portion upon which is secured a fuel tank 28 connected by a supply pipe 30 with the engine carburetor 32. An implement carrying frame is attached to the support 14 by means now to be described. Extending down from the lower portion of this support, there is a forwardly curved lug 34 adapted to be received in a hole formed in a cross plate 36, which as shown in Fig. 4 connects the forward ends of a pair of rearwardly extending frame members 38. The upper portion of the support 14 is provided with a downwardly extending lug 40 which is adapted to be received in a recess formed in a block 42 secured between the forward convergent ends of a pair of brace rods 44 whose rear ends are secured to slides 46 adjustably attached to the frame members 38. It will be understood that the inclination of the frame members 38 relatively to the support 14 may be varied by adjusting the slides 46 and that the frame members 38 may be readily attached when the support 14 is tilted. The rear portion of the support 14 carries a pair of socket members 48 which receive the forward ends of hollow handles 50 shown in section in Fig. 7 and having hand-engageable members 52 secured to their rear ends. Pivotally attached to the members 52, there are levers 54 to which the rear ends of wires or small rods 56 are secured. These wires extend through the hollow handles 50 and their forward ends are attached to connections 58 by means of which the friction wheels 22 may be engaged with and disengaged from the driving flanges 24 for the purpose of propelling and stopping the tractor. The frame members 38 carry ground-working tools 60 such as cultivator teeth, the manner of attachment of which will be referred to later. A cross rod 62 is adjustably secured to the frame members 38 by clamps 64. An upwardly extending rod 66 having a rearwardly bent upper portion 68 is secured centrally to the rod 62 by a clamping member 70. Screws 72 engage with the handles 50 and pass through the upper ends of a U-shaped bar 74 so that the body portion of this bar is disposed beneath the rod member 68. Upon lifting the handles 50, it is evident that the cultivator teeth 60 will be lifted from the position shown in Fig. 1 into that shown in Fig. 2 in order that the teeth may be freed from weeds. Toward the rear ends of the frame members, a cross rod 76 is adjustably secured thereto by clamping members 78. Blocks 80 are adjustably secured to the rod 76 outside of the frame members 38 as will be understood from Fig. 4. Hangers 82 extend down from the blocks 80, these hangers having forwardly bent end portions 84 containing holes through which rods 86 pass slidably, these rods also passing slidably through holes in angle plates 88 secured to the blocks 80. Stop collars 90 are adjustably secured to the rods 86 below the angle plates 88. The upper end portions of the rods 86 are bent rearwardly and connected by a rod 92 pivotally attached thereto by clamping members 94. Referring to Fig. 1 which shows the member 94 and the rear end of the rod 86 in section, it will be understood that the lower portion of the member 94 is reduced so as to be received for turning movement in a hole made in the rearwardly bent portion of the rod 86, this reduced portion then being headed sufficiently so that the reduced portion of the member 94 is kept in place. The lower ends of the rods 86 are turned outwardly as best shown in Fig. 6 to constitute spindles for trailer wheels 96 whose hubs 97 have recesses for receiving the spindles and having peripheral flanges 98 which are engaged by projections carried by blocks 100 mounted on the rods 86, these blocks serving to hold the wheels on their spindles. The blocks 100 carry mud-removing bars 102. The lower ends of arms 104 are pivotally attached to the blocks 80. The upper end portions of these arms are bent rearwardly and connected by a rod 106 adjustably secured thereto. Plates 108 are secured to the arms 104, these plates having notches in their upper and lower margins. The rod 92 engages in the upper pair of notches when the device is in the position of Fig. 2 while in the position of Figs. 3 and 5, the rod 92 engages in the lower pair of these notches. A vertical tube 110 is secured to the middle of the rod 76 as best shown in Fig. 5, this tube rotatably receiving a rod 112. A rearwardly extending arm 114 is secured to the upper end of the rod 112, this arm containing a slot 116 through which passes a rod 118, secured to and extending up from the middle portion of the rod 92. It is now evident that upon swinging the arm 114 in one direction or the other, the trailer wheels 96 will be correspondingly swung on account of the fact that the rod 92 as previously stated connects the upper ends of the rods 86 upon whose lower outturned ends the wheels 96 are mounted. In order that the arm 114 may be swung by the operator who walks behind the implement, a rearwardly extending handle 120 is secured in an opening in the arm 114 by a set screw 122. It is evident that the operator by grasping the handle 120 may readily steer the implement independently of the tractor by swinging the handle 120. This handle is offset as shown so that the operator instead of having to straddle the row which is being cultivated may walk directly behind either of the trailer wheels 96. This result may be readily accomplished by loosening the set screw 122 whereupon the handle 120 may be turned into either of the positions indicated in Fig. 4 by the dotted lines 120' and 120''. If desired, the operator may lock the wheels 96 from swinging movement by turning down a set screw 123 which turns through the tube 110 and may be turned down into engagement with the rod 112 as will be understood from Figs. 4 and 5. In order that additional cultivator teeth may be carried by the implement, a pair of horizontal bars 124 are secured to depending projections carried by the blocks 80. The bars 124 extend forwardly and are adjustably secured to the cross rod 62 by clamping members 126 as will be understood from Fig. 4. Ahead of the rod 62, the bars 124 have outturned portions 128 from whose outer ends there are backwardly bent portions 130. The members 124 and 130 are held in properly spaced position by bolts 132 passing through spacer elements 134 placed between the two members at a place just below the rod 62 as shown in Fig. 7. The manner in which the cultivator teeth are attached will be understood from Figs. 1 and 4. Downwardly extending bars 136 are secured to the frame members 38 and also to the members 124 and 130 if desired, by clamps 138. Each of the bars 136 has two holes near its lower end through which two bolts 140 and 142 extend so positioned that the latter bolt is underneath the former bolt. The bolt 140 also passes through an arcuate slot 144 in the upper end of an angle member 146 while the bolt 142 passes through a hole in the angle member 146 just above an outstanding flange 148 carried thereby. The shank of the cultivator tooth 60 has a flange 150 on its upper end adapted to engage the lower surface of the flange 148. A bolt 152 passing through these two flanges serves to hold the cultivator tooth in properly adjusted position. When the cultivator tooth wears away, it may be rocked by loosening the bolt 140 whereupon the angle member 146 may be given a movement of rotation so that compensation is obtained for the worn tooth.

The operation and advantages of my invention will be apparent from the foregoing description. The tractor having the implement attached thereto is propelled along the ground by the engine and is easily manipulated and steered by the operator who walks at the rear so that he can grasp either or both of the hand-engageable members 52. The tractor wheels may be readily controlled for steering the tractor and since the drawbar connections at 40 and 34 of the implement frame with the support are central pivotal connections lying in a common vertical plane with the shaft 12 which connects the two tractor wheels 10, the tendency is for the implement frame to be pulled straight ahead with the tractor. Not only do the connections 66 and 74 between the handle members 50 and the implement frame permit sufficient movement of the handle members for steering the tractor without interfering with the forward pull on the implement frame, but these connections also permit independent steering of the implement frame so that the operator by grasping the handle 120 may cause the cultivator teeth to approach as closely as desired to the rows of plants which are being cultivated. By comparing Figs. 1 and 2, it will be understood that with the pivoting arms 104 in their rearward position as shown, upon lifting the handles 50, the implement frame will also be lifted until the plates 108 engage the rod 92 without lifting the trailer wheels 96 off the ground. If the lifting movement on the handles 50 be now continued, the wheels 96 will be lifted from the ground. However, upon swinging the arms 104 forwardly, the implement frame may be still further lifted without raising the wheels 96 since the plates 108 will now pass the rod 92. Upon now swinging the arms 104 rearwardly, the plates 108 will be engaged above the rod 92 as shown in Figs. 3 and 5 so that the cultivator teeth will be maintained above the ground in order that the device may be readily transported from one place to another. While the device is shown in Fig. 4 as being arranged to cultivate a single row of plants on both sides of the row, it is evident that upon securing additional cultivator teeth to the bar members 124 and 130, more than one row can be cultivated at a time. Since most of the parts of the implement may be constructed of standard bars, rods, bolts, etc., and since the side members may be used for either the right or left side, the implement may be expeditiously and economically manufactured.

I claim:

1. An agricultural implement comprising a frame adapted for carrying ground-working tools, a pair of vertical rods extending slidably through the rear portion of said frame, trailer wheels carried by the lower ends of said rods, horizontal crank members carried by said rods, a horizontal rod pivotally connecting said crank members, a vertical projection attached to the center of said horizontal rod, a horizontally swinging arm carried by said frame and containing an opening into which said projection extends, and a handle member extending rearwardly from said arm for swinging said trailer wheels in unison to steer said frame.

2. An agricultural implement comprising a frame adapted for carrying ground-working tools, a pair of vertical rods extending slidably through the rear portion of said frame, the lower ends of said rods being turned outwardly to constitute spindles and the upper ends of said rods being turned rearwardly to constitute crank members, trailer wheels mounted on said spindles, a horizontal rod pivotally connecting said crank members, a vertical rod secured to the center of said horizontal rod, a rotatably mounted rod extending up from said frame, a horizontally swinging arm carried by the upper end of said rotatable rod and containing a longitudinal slot through which said vertical rod passes, and a handle member extending rearwardly from said arm for swinging said trailer wheels in unison to steer said frame.

3. An agricultural implement comprising a frame adapted for carrying ground-working tools, a pair of vertical rods extending slidably through the rear portion of said frame, trailer wheels carried by the lower ends of said rods, horizontal crank members carried by said rods, a horizontal rod pivotally connecting said crank members, a vertical projection attached to the center of said horizontal rod, a horizontally swinging arm carried by said frame and containing an opening into which said projection extends, a handle whose rear portion is offset from its front portion, the rear of said arm containing a horizontal opening for rotatably receiving the forward end of said handle member, and a set screw for securing said handle from rotation whereby said offset portion may be held in different lateral positions for grasping by an operator for swinging said trailer wheels in unison to steer said frame.

4. An agricultural implement comprising a frame adapted for carrying ground-working tools, a pair of vertical rods extending slidably through the rear portion of said frame whereby the latter may be raised independently of said rods, trailer wheels carried by the lower ends of said rods, a horizontal rod connecting the upper ends of said rods, pivoted arms extending up from said frame, and projections carried by said arms which are adapted to engage the upper side of said horizontal rod when said frame is in its raised position.

In testimony whereof I hereunto affix my signature.

CORNELIUS A. PETERS.